United States Patent
Sondhi et al.

(10) Patent No.: US 8,204,861 B2
(45) Date of Patent: Jun. 19, 2012

(54) EVENT DRIVEN AUDIT LOGGING

(75) Inventors: Bhupinder Sondhi, Fremont, CA (US); Shashidar Bellur, Bangalore (IN); Santhosh Thomas, Ranny (IN)

(73) Assignee: Oracle International Corporation, Redwood Shores, CA (US)

( * ) Notice: Subject to any disclaimer, the term of this patent is extended or adjusted under 35 U.S.C. 154(b) by 212 days.

(21) Appl. No.: 12/537,877

(22) Filed: Aug. 7, 2009

(65) Prior Publication Data

US 2011/0035242 A1    Feb. 10, 2011

(51) Int. Cl.
    *G06F 17/30* (2006.01)
(52) U.S. Cl. ......... 707/648; 707/650; 707/672; 715/854
(58) Field of Classification Search ................... 707/648, 707/650, 672; 705/7.11
    See application file for complete search history.

(56) References Cited

U.S. PATENT DOCUMENTS

| | | | | |
|---|---|---|---|---|
| 7,849,442 | B2 * | 12/2010 | Hashizume et al. | 717/121 |
| 2002/0091928 | A1 * | 7/2002 | Bouchard et al. | 713/178 |
| 2008/0082377 | A1 * | 4/2008 | Kennis et al. | 705/7 |
| 2009/0024522 | A1 * | 1/2009 | Reunert et al. | 705/40 |
| 2009/0077135 | A1 * | 3/2009 | Yalamanchi et al. | 707/648 |
| 2010/0070930 | A1 * | 3/2010 | Thibault | 715/854 |
| 2010/0115284 | A1 * | 5/2010 | Hahn et al. | 713/179 |
| 2010/0325698 | A1 * | 12/2010 | Ginter et al. | 726/4 |

OTHER PUBLICATIONS

Author Unknown, "Audit Manager," Glovia International, Inc., 2008, 2 pages.
Author Unknown, "Audit Tracking," Intuit Real Estate Solutions, [online], 2008, [retrieved on Jan. 15, 2009], 2 pages. Retrieved from: http://www.realestate.intuit.com/products/addons/Audit%20Tracking.asp.
Author Unknown, "OpenPro Accounts Payable Module Overview," OpenPro, Inc., [online], 1998-2008, [retrieved on Jan. 15, 2009], 5 pages. Retrieved from: http:// www.openpro.com/proap.html.
Author Unknown, "Sage MAS 500," Sage Software, Inc., 2005, 2 pages.
Waters, B., et al., "Building an Encrypted and Searchable Audit Log," The Internet Society, 2002, 11 pages.

* cited by examiner

*Primary Examiner* — Shahid Alam
*Assistant Examiner* — Mohammad Kabir
(74) *Attorney, Agent, or Firm* — Kilpatrick Townsend & Stockton LLP

(57) ABSTRACT

This disclosure describes, generally, methods and systems for implementing event driven audit logging. The method includes establishing, at an audit logging system, audit logging framework configured to provide application independent connectivity and further configured to provide event driven audit logging. The method further includes receiving, at the audit logging system, a selection of an application to provide event driven auditing, enabling event driven auditing for the selected application, and receiving a selection of event types to enable for auditing by the audit logging framework. Furthermore, the method includes based on the selected event types, tracking the application actions associated with the selected events, creating an event log for the application, and providing access to the event log.

20 Claims, 8 Drawing Sheets

Audit Search Setup

Application Name: Accounts Payable
Document Name: Payment
Audit Table Name: AP_PYMT_AUD_TBL

Search Fields

Find | First ◀ 1-4 of 4 ▶ Last

| *Seq | *Field Name | *Page Field Type | Index | Set Cntl Value | Search Criteria | Purge Criteria | Required Field | Prompt | Setid Based | | |
|---|---|---|---|---|---|---|---|---|---|---|---|
| 1 | BANK_SETID | Edit Box | ☐ | ☐ | ☑ | ☑ | ☑ | SP_SETBNK_NONW | ☐ | + | – |
| 2 | BANK_CD | Edit Box | ☐ | ☐ | ☑ | ☑ | ☑ | BANK_CD_VW2 | ☐ | + | – |
| 3 | BANK_ACCT_KEY | Edit Box | ☑ | ☐ | ☑ | ☑ | ☑ | BANK_ACCT_VW | ☐ | + | – |
| 4 | PYMNT_ID | Edit Box | ☐ | ☐ | ☑ | ☑ | ☐ | PAYMENT_TBL_VW | ☐ | + | – |

Register for Audit Logging — 800

Application: Accounts Payable

[Add Document]

Document

Name: Voucher  Code:

[Add Event]  Audit Log Tablename:

Event  Find  First ◄ 1 of 1 ► Last

Event Code

FIG. 8 ical description of the present invention.

EVENT DRIVEN AUDIT LOGGING

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates, in general, to audit logging and, more particularly, to application independent audit logging.

BACKGROUND

Typically, large enterprises have a few hundred (or even a few thousand) users and administrators which have access to various documents (or transactions), some of which can post and other of which can unpost, modify, etc. It is a considerable challenge to know which the users or administrators did what to which document and when. In some products the user id and date-time of a change are not even recorded, and if this is recorded, then only the last change is recorded and the details of any previous changes are overwritten (and hence lost forever). In cases where multiple users have made modifications to the same document (or transaction), a significant potions of the activities associated with the document are not visible.

Another option is to use record level tracking. The disadvantages of record level tracking is that all the changes which occur to the record are logged (irrespective of significance) and hence the volume of the logs is overwhelming and unmanageable. In addition, there is no convenient way of viewing/searching through such logs. Hence, for at least these reasons, there is a need for improvements in the art.

BRIEF SUMMARY

Embodiments of the present invention are directed to a computer implemented method of implementing event driven audit logging. The method includes establishing, at an audit logging system, audit logging framework configured to provide application independent connectivity and further configured to provide event driven audit logging. The method further includes receiving, at the audit logging system, a selection of an application to provide event driven auditing, enabling event driven auditing for the selected application, and receiving a selection of event types to enable for auditing by the audit logging framework. Furthermore, the method includes based on the selected event types, tracking the application actions associated with the selected events, creating an event log for the application, and providing access to the event log.

In an alternative embodiment, a machine-readable medium implementing event driven audit logging. The machine-readable medium includes instructions for establishing, at an audit logging system, audit logging framework configured to provide application independent connectivity and further configured to provide event driven audit logging. The machine-readable medium further includes instructions for receiving, at the audit logging system, a selection of an application to provide event driven auditing, enabling event driven auditing for the selected application, and receiving a selection of event types to enable for auditing by the audit logging framework. Furthermore, the machine-readable medium includes instructions for based on the selected event types, tracking the application actions associated with the selected events, creating an event log for the application, and providing access to the event log.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 is a user interface illustrating an interface for setting up event driven audit logging, in accordance with one embodiment of the present invention.

FIG. 8 is a user interface illustrating an interface for accessing event driven audit logging, in accordance with one embodiment of the present invention.

DETAILED DESCRIPTION OF THE INVENTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the present invention relate to event driven audit logging to provide specialized and customized logging for documents, application, etc. The present invention provides for logging and reporting for any given document or application based on any event that touches (or involves) the given document or application. For example, if a user desires to log any modifications to document X, or alternatively to log postings and updates performed by application Y, such functionality is made possible by the present invention.

Figure 1:
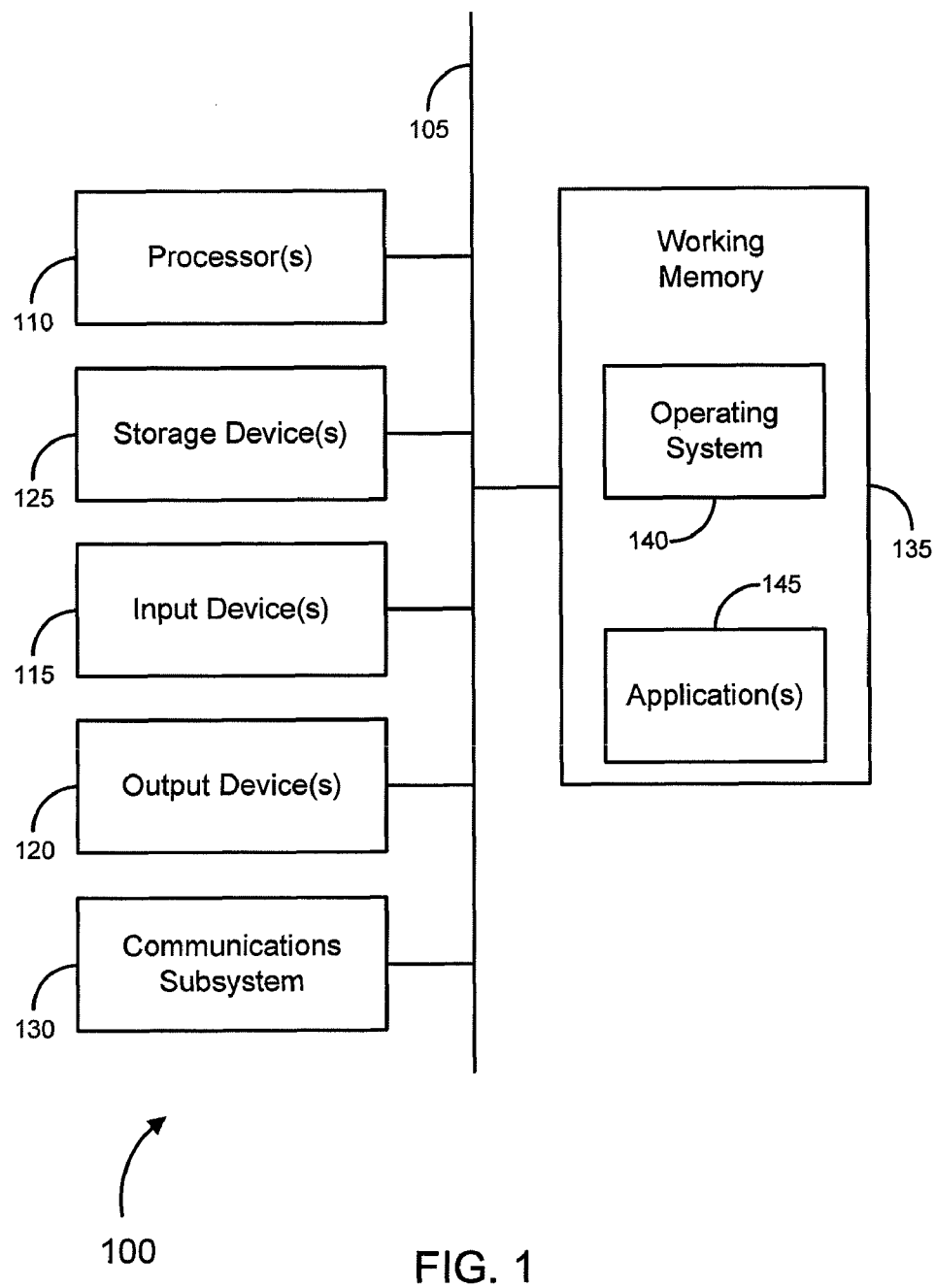
FIG. 1 is a generalized schematic diagram illustrating a computer system, in accordance with various embodiments of the present invention.

Turning now to FIG. 1 provides a schematic illustration of one embodiment of a computer system 100 that can perform the methods of the invention, as described herein. It should be noted that FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 105 (or may otherwise be in communication, as appropriate). The hardware elements can include one or more processors 110, including without limitation, one or more general purpose processors and/or one or more special purpose processors (such as digital signal processing chips, graphics acceleration chips, and/or the like); one or more input devices 115, which can include without limitation a mouse, a keyboard and/or the like; and one or more output devices 120, which can include without limitation a display device, a printer and/or the like.

The computer system 100 may further include (and/or be in communication with) one or more storage devices 125, which can comprise, without limitation, local and/or network accessible storage and/or can include, without limitation, a disk drive, a drive array, an optical storage device, a solid state storage device such as a random access memory ("RAM") and/or a read-only memory ("ROM"), which can be programmable, flash updateable and/or the like. The computer system 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), and/or any other devices described herein. In many embodiments, the computer system 100 will further comprise a working memory 135, which can include a RAM or ROM device, as described above.

The computer system 100 also can comprise software elements, shown as being currently located within the working memory 135, including an operating system 140 and/or other code, such as one or more application programs 145, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 125 described above. In some cases, the storage medium might be incorporated within a computer system, such as the system 100. In other embodiments, the storage medium might be separate from a computer system (i.e., a removable medium, such as a compact disc, etc.), and is provided in an installation package, such that the storage medium can be used to program a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 100) to perform methods of the invention. According to a set of embodiments, some or all of the procedures of such methods are performed by the computer system 100 in response to processor 110 executing one or more sequences of one or more instructions (which might be incorporated into the operating system 140 and/or other code, such as an application program 145) contained in the working memory 135. Such instructions may be read into the working memory 135 from another machine-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer readable medium," as used herein, refer to any medium that participates in providing data that causes a machine to operate in a specific fashion. In an embodiment implemented using the computer system 100, various machine-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media includes, for example, optical or magnetic disks, such as the storage device(s) 125. Volatile media includes, without limitation, dynamic memory, such as the working memory 135. Transmission media includes coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio wave and infra-red data communications).

Common forms of physical and/or tangible computer-readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc., carried by the signals) to the working memory 135, from which the processor(s) 110 retrieves and executes the instructions. The instructions received by the working memory 135 may optionally be stored on a storage device 125 either before or after execution by the processor(s) 110.

Figure 2:
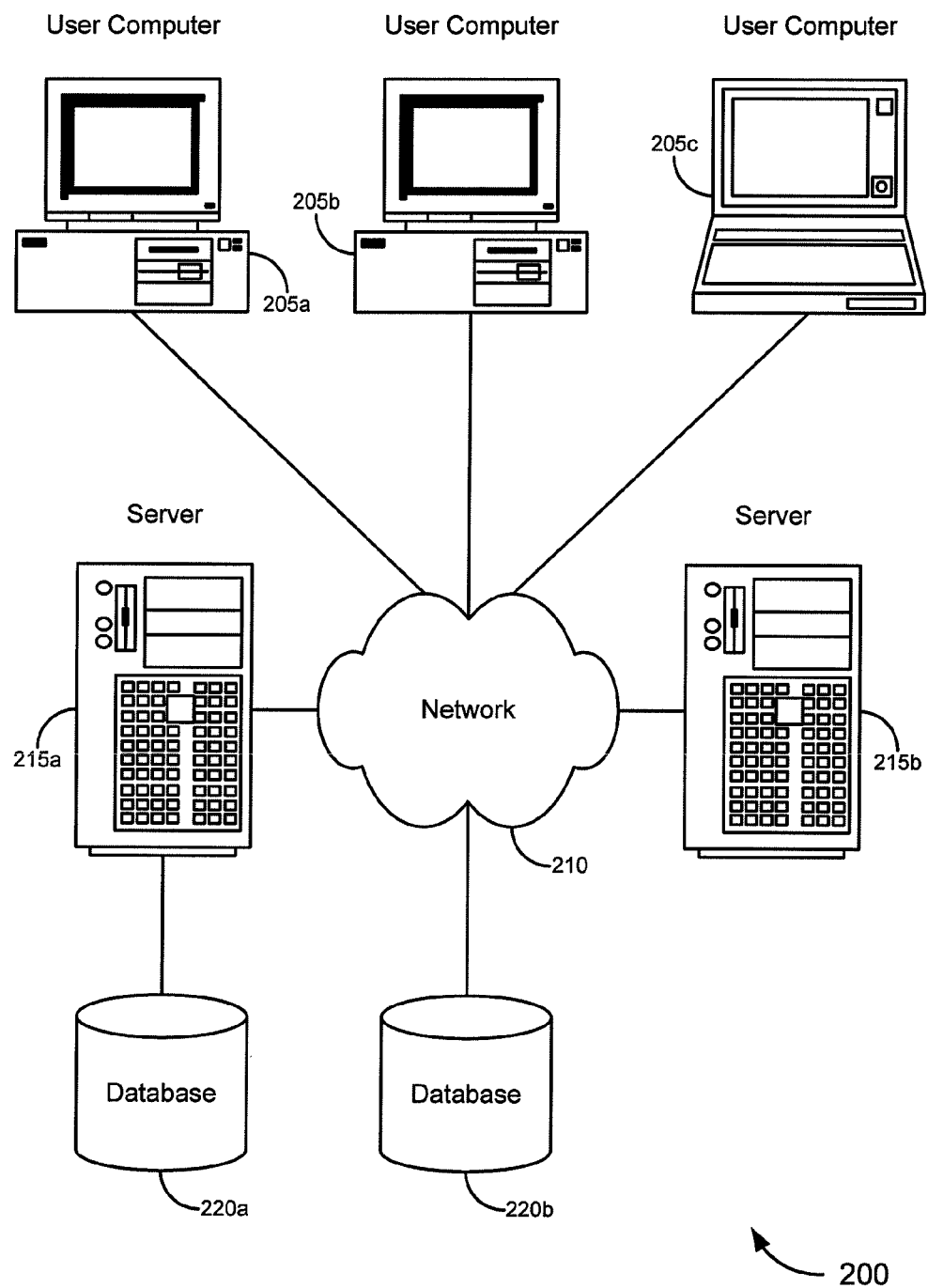
FIG. 2 is a block diagram illustrating a networked system of computers, which can be used in accordance with various embodiments of the present invention.

Merely by way of example, FIG. 2 illustrates a schematic diagram of a system 200 that can be used in accordance with one set of embodiments. The system 200 can include one or more user computers 205. The user computers 205 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially available UNIX™ or UNIX-like operating systems. These user computers 205 can also have any of a variety of applications, including one or more applications configured to perform methods of the invention, as well as one or more office applications, database client and/or server applications, and web browser applications. Alternatively, the user computers 205 can be any other electronic device, such as a thin-client computer, Internet-enabled mobile telephone, and/or personal digital assistant (PDA), capable of communicating via a network (e.g., the network 210 described below) and/or displaying and navigating web pages or other types of electronic documents. Although the exemplary system 200 is shown with three user computers 205, any number of user computers can be supported.

Certain embodiments of the invention operate in a networked environment, which can include a network 210. The network 210 can be any type of network familiar to those skilled in the art that can support data communications using any of a variety of commercially available protocols, including without limitation TCP/IP, SNA, IPX, AppleTalk, and the like. Merely by way of example, the network 210 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infrared network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 215. Each of the server computers 215 may be configured with an operating system, including without limitation any of those discussed above, as well as any commercially (or freely) available server operating systems. Each of the servers 215 may also be running one or more applications, which can be configured to provide services to one or more clients 205 and/or other servers 215.

Merely by way of example, one of the servers 215 may be a web server, which can be used, merely by way of example, to process requests for web pages or other electronic documents from user computers 205. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 205 to perform methods of the invention.

The server computers 215, in some embodiments, might include one or more application servers, which can include one or more applications accessible by a client running on one or more of the client computers 205 and/or other servers 215. Merely by way of example, the server(s) 215 can be one or more general purpose computers capable of executing programs or scripts in response to the user computers 205 and/or other servers 215, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configuration, database clients, API clients, web browsers, etc.) running on a user computer 205 and/or another server 215. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 205 via a web server (as described above, for example). Similarly, a web server might receive web page requests and/or input data from a user computer 205 and/or forward the web page requests and/or input data to an application server. In some cases a web server may be integrated with an application server.

In accordance with further embodiments, one or more servers 215 can function as a file server and/or can include one or more of the files (e.g., application code, data files, etc.) necessary to implement methods of the invention incorporated by an application running on a user computer 205 and/or another server 215. Alternatively, as those skilled in the art will appreciate, a file server can include all necessary files, allowing such an application to be invoked remotely by a user computer 205 and/or server 215. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 220. The location of the database(s) 220 is discretionary. Merely by way of example, a database 220a might reside on a storage medium local to (and/or resident in) a server 215a (and/or a user computer 205). Alternatively, a database 220b can be remote from any or all of the computers 205, 215, so long as the database can be in communication (e.g., via the network 210) with one or more of these. In a particular set of embodiments, a database 220 can reside in a storage-area network ("SAN") familiar to those skilled in the art. (Likewise, any necessary files for performing the functions attributed to the computers 205, 215 can be stored locally on the respective computer and/or remotely, as appropriate.) In one set of embodiments, the database 220 can be a relational database, such as an Oracle™ database, that is adapted to store, update, and retrieve data in response to SQL-formatted commands. The database might be controlled and/or maintained by a database server, as described above, for example.

application tables may correspond to each application which is configured to utilize the framework. The tables may include configuration data and parameters (e.g., logging parameters, access parameters, etc.), information about the applications, and event logging parameters (i.e., the types of events for which the application is to monitor.

The following Table 1 is one example of an application framework table according to embodiments of the present invention:

TABLE 1

| Name | Description | Implications |
| --- | --- | --- |
| Application | This is the application/product. E.g. AP, AR, GL | This field is a search parameter. Establishing this in the search page will set the context for the main page. This is translatable. |
| (Document) Code | This is the code for the document. | Use the code since the document name will be translatable. |
| (Document) Name | This the document name | This is editable on the main page. This is translatable (by way of a language record). Also, the product developer has to add to documents that are being covered by Audit Logging here. |
| Audit Log Tablename | This is the table in which the audit logs of the document will be recorded. | The audit logging utility may look at this field to determine the table into which the data is written. The table exists in the database with the same structure as expected by the application. |
| Event | This is the event/state of the document. | Events added under a document are considered as registered. The individual products may determine the superset of events for each of their documents. The application development team for the product may enhance their code to call the Audit Logging utilities when the document reaches this state/status. This is translatable(by way of a language record). |
| Event Code | This is the code for the event | The codes may be unique for a document. The application passes this as a parameter to the audit logging utility. |

Figure 3:
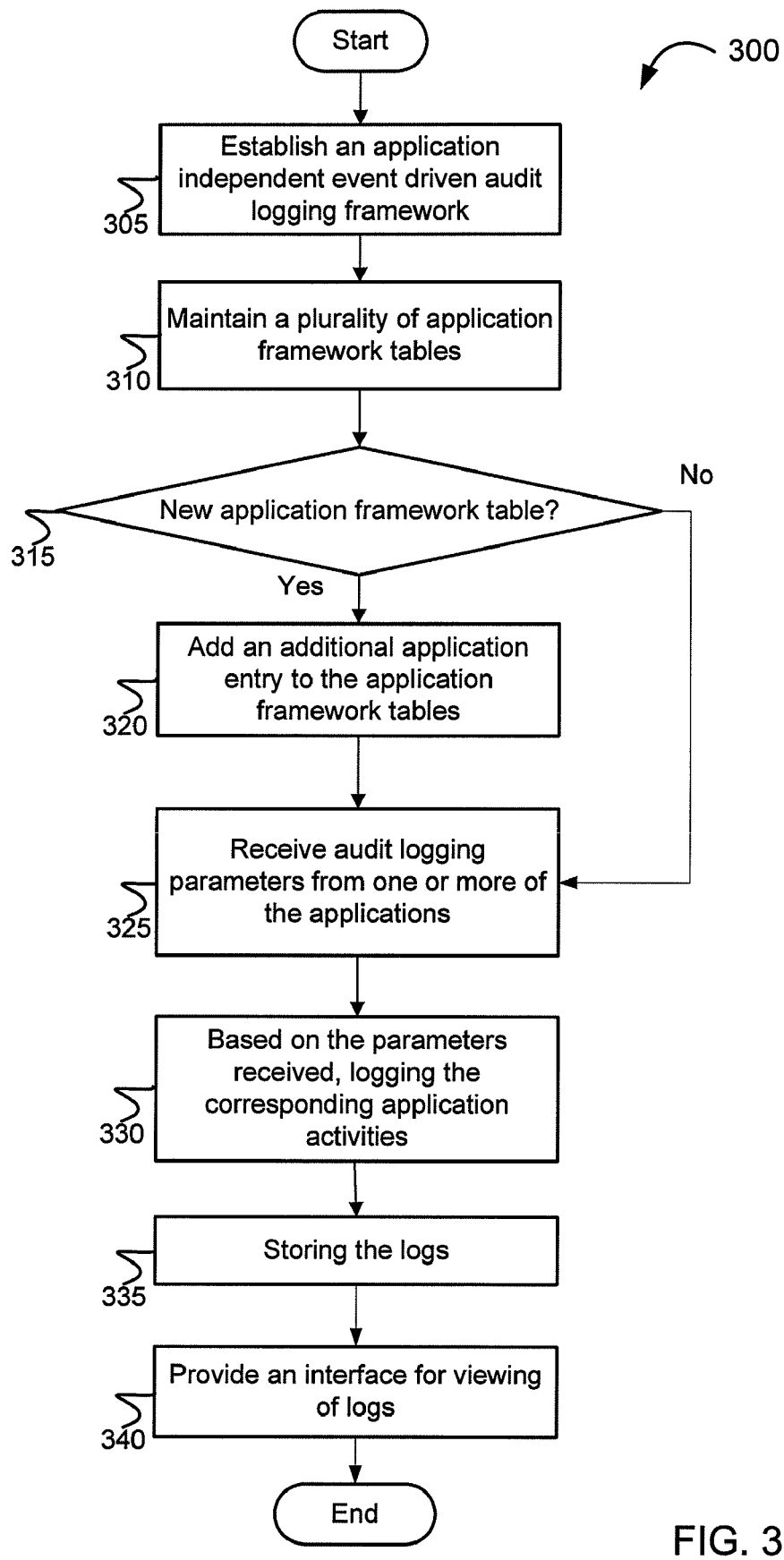
FIG. 3 is a flow diagram illustrating a method of event driven audit logging, in accordance with one embodiment of the present invention.

Turning now to FIG. 3, which illustrates a method 300 of implementing event driven audit logging according to aspects of the present invention. At process block 305, an application independent event driven audit logging framework is established. In one embodiment, the framework is application independent in that any type of application may "plug-in" to the framework. For example, the framework may be utilized by a document management application, an access management application, a supply database application, etc. In order to access the framework, any application can simply access the framework's APIs and utilize the audit logging functionality of the framework.

In a further embodiment, the event driven aspect of the framework may include the ability to configure the framework to log activities associated with certain events with respect to the application. For example, and event may be a document creation, a document deletion, an update, a submission for approval, approval, an overwrite, a post, a cancellation, a confirmation, a resubmit, etc. Any such event type (or any other even which touches an application (or an application's data/documents) may be audited and logged.

At process block 310, multiple application framework tables may be maintained. Such tables may be stored in a database, or the like. In one embodiment, the framework Furthermore, new applications may be added to the application framework tables. A determination is made by the audit logging framework whether a new application table had been added (decision block 315). In other words, a determination is made whether a new application has been configured to utilize the audit logging framework. If a new application has been added, then at process block 320, a new table entry is added to the framework tables such that the new application is configured to utilize the framework. Otherwise, if no new applications have been added, then the process moves to process block 325.

At process block 325, the audit logging framework is configured to receive logging parameters. Audit logging parameters may include event types to audit, security parameters, application log on parameters, document type parameters, and so forth. Hence, based on such parameters, the audit logging framework proceeds to log various events in connection with the applications as specified. For example, if the application is a document access and storage application, and the application is configured the framework to monitor posting and editing of documents within the application, then the framework would log any such activity that fits the criteria. Accordingly, as the application and the auditing parameters for each application are changed, the framework will audit and log different events, per the application configuration parameters. The logging is completely scalable and customizable to log as much or as little as the user or administrator desires.

At process block 335, the logs are stored for each of the applications. In one embodiment, the logs may be stored in a log database, or the like, and further the logs may be sorted any organized for ease of access and viewing. Then, at process block 340, the logs are made available to each application (or application user/administrator), respectively. The logs may be view, sorted, and filters as desired by the user or administrator. Furthermore, the logs may be viewed in a browser, on any display type, on a portable or handheld device, a mobile device or any other device suitable for displaying such audit logging information.

Figure 4:
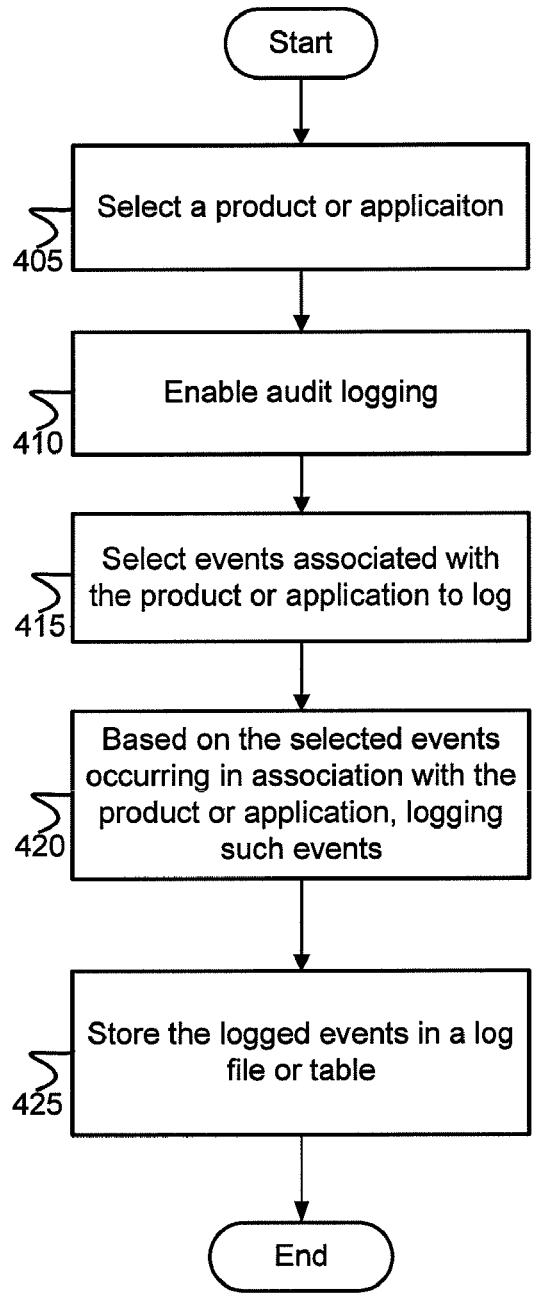
FIG. 4 is a flow diagram illustrating a method of event driven audit logging, in accordance with a further embodiment of the present invention.

Referring next to FIG. 4, which illustrates a method 400 of implementing event driven audit logging according to further aspects of the present invention. At process block 405, within the audit logging framework an application (or product) may be selected such that the application may utilize the audit logging framework. At process block 410, audit logging within the framework may be enabled.

Furthermore, in connection with, or separately from enabling the audit logging, specific events within the application to be logged my be selected (process block 415). Events may be those similar to the events described above, or any other event which may occur in any of the applications for which the event driven audit logging framework had been enabled.

Thus, based on the selected events occurring within the application, a log file of table is generated any the events are logged within the table (process block 420). Furthermore, the log file or table is stored such that is may be accessed and view by users or administrators of the application.

Figure 5:
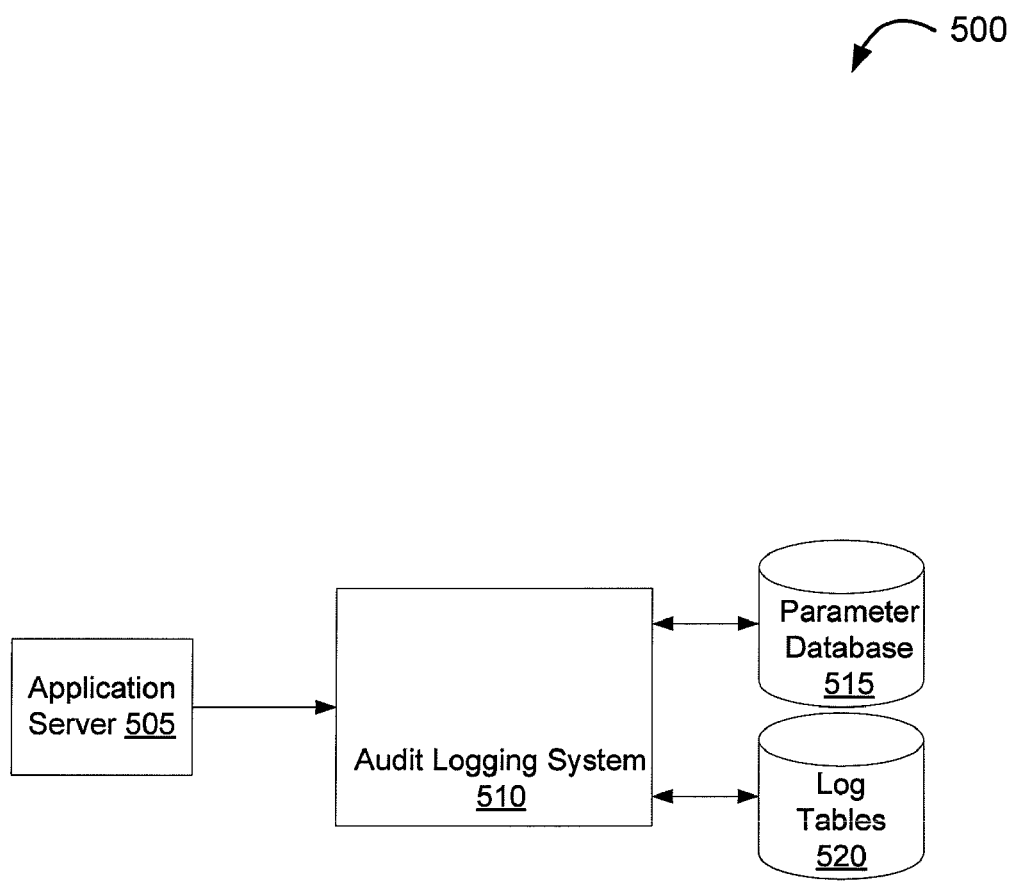
FIG. 5 is a block diagram illustrating a system for implementing event driven audit logging, in accordance with one embodiment of the present invention.

Turning now to FIG. 5, which illustrates a system 500 for implementing event driven audit logging according to aspects of the present invention. In one embodiment, system 500 may include an application server 505, an audit logging system 510, a parameter database 515, and log tables 520. In one embodiment, system 500 may be utilized to implement methods 300, 400, and 600 (FIGS. 3, 4, and 6). For example, application server 505 my execute any one of the applications described above, and furthermore, audit logging system 510 may be configured to execute the event driven audit logging framework, described above.

Furthermore, parameters database 515 may stored audit parameters for each of the applications, and log tables 520 may be configured to store the audit log table generated by the audit logging framework, per the parameters stored in parameters database 515.

For example, application server 505's application may transmit required data to the audit logging framework running on audit logging system 510 via, for example, the audit logging frameworks' APIs. Additionally, the application may pass configuration parameters to audit logging system 510 to be stored in parameter database 515 by audit logging system 510. Then, audit logging system 510 checks parameter database 515 to determine whether audit logging has been enabled.

Accordingly, if audit logging is enabled, then as application server 505's application performs events which correspond to the events selected in the parameters, then audit logging framework running on audit logging system 510 would log such activities and store the logs in log tables 520. Further, a user and/or administrator is granted access to log tables 520, via audit logging system 510, in order to view (or read) and display the log data. Further, audit logging system may include a configurable search mechanism for searching audit data.

In one embodiment, the search page for each document is be displayed based on the configuration in, for example, an audit search setup page. Turning now to FIG. 6, which illustrates one embodiment of such a page. In one embodiment, a framework administrator may utilize audit search setup 600 to provide an application developer of each product to input the relevant data corresponding to each document. In a further embodiment, the data shown in audit search setup 600 may be entered by an accounts payable application developer for the setup of payment audit log search.

The data entered in audit search setup page 600 may be used to design an audit log search page for each document during runtime. The field names shown in the grid are fields for which the table specified in audit table name field in this page. Seq column field 605 shows the sequence of arranging the search fields on the search page, Field Name column 610 shows the name to be displayed against the field on the search page, and Page Field Type column 615 indicates whether the field is an edit box or a drop down.

Furthermore, Index column field 620 shows whether the field is based on an index. While looking into the search page below, a dropdown against Index column field 620 (instead of "="). The dropdown may have the following options shown in Table 2:

TABLE 2 begins with
contains
ends with
is equal to
is greater than
is greater than or equal to
is less than
is less than or equal to
is not equal to Set control value column field 625 shows whether set control based functionality is enabled. Furthermore, Search Criteria column field 630 indicates whether the field should be displayed in a Search Page, Purge Criteria column field 635 indicates whether this field should be displayed in a Purge Page, Required Field column field 640 indicates whether the current field is a required field or not, and Prompt column field 645 assigns a prompt table for the field. Further, Set ID value column field 650 shows whether set ID based functionality is enabled.

Figure 7:
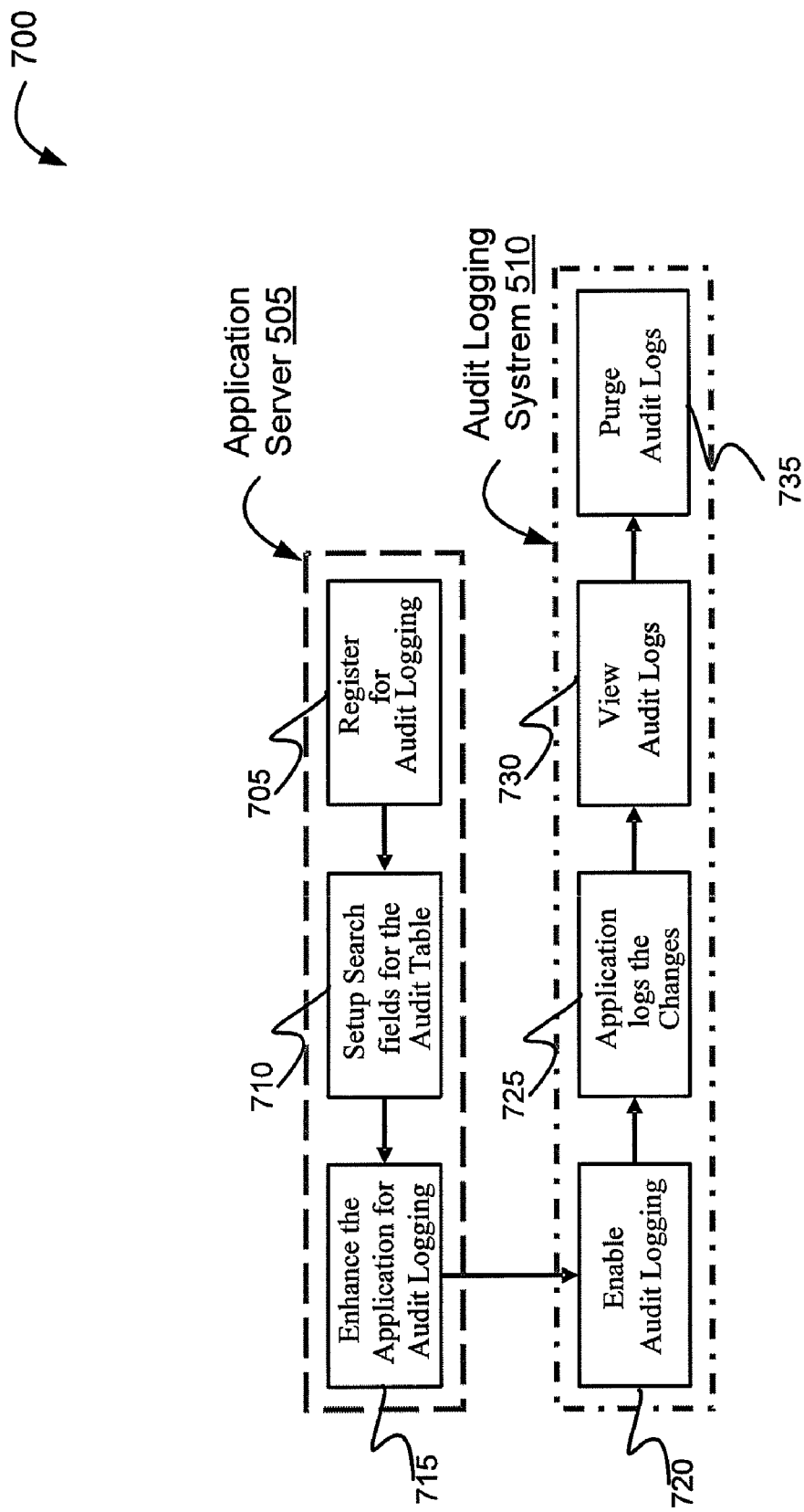
FIG. 7 is a flow diagram illustrating a method of event driven audit logging, in accordance with another embodiment of the present invention.

FIG. 7 illustrates a method 700 of implementing event driven audit logging according to further aspects of the present invention. At process block 705, application 505 may register for audit logging with audit logging system 510. At process block 720, search fields for the audit table may be setup. In one embodiment, establishing these search fields in a search page will set the context for a main page, which is translatable.

At process block 715, application 505 may be enhanced (or modified) for audit logging. The process continues to audit logging system 510, and at process block 720, audit logging is enabled by audit logging system 510. At process block 725, the changes to documents of other application data is logged for the specified events. Then at process block 730, the audit logs may be view and then purges, as necessary (process block 735). The logs may be purged in order to provide users and administrators of applications running on application server 505 with a more manageable and readable set of logs, which are fresh and new.

Now turning to FIG. 8, which illustrates an interface 800 for accessing event driven audit logging information in accordance with aspects of the present invention. Certain aspects of the present invention may utilize user interfaces (UIs) in order to provide users, power users, administers, and the like with access to the audit framework in order to configure the audit logging framework, as well as view and manipulate log files. The specific layout of UI 800 is merely for exemplary purposes, and one skilled in the art would recognize that any number of UIs and UI configurations may be used in conjunction with embodiments of the present invention.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of implementing event driven audit logging with at least one processor, the method comprising:
    establishing, at an audit logging system, an audit logging framework configured to provide application independent connectivity and further configured to provide event driven audit logging;
    receiving, at the audit logging system, a selection of an application to provide event driven audit logging, wherein event driven audit logging comprises logging any event that involves the application and associated applications or documents;
    plugging in the application into the audit logging framework, wherein the plugging in provides integrated communication between the audit logging framework and the application;
    enabling event driven auditing for the selected application;
    receiving a selection of event types to enable for auditing by the audit logging framework;
    based on the selected event types, tracking the application actions which are only associated with the selected events;
    creating an event log for the application, wherein the event log only includes the tracked applications for the selected events; and
    providing access to the event log.

2. The method of claim 1, wherein the event types comprise one or more of the following: creation, deletion, update, submission for approval, approval, overwrite, post, cancellation, confirmation, and resubmit.

3. The method of claim 1, wherein an application comprises a document.

4. The method of claim 3, wherein a document comprises one or more of the following: a voucher, a deposit, and a payment.

5. The method of claim 1, further comprising maintaining a plurality of framework tables.

6. The method of claim 5, wherein the plurality of framework tables comprise entries configured to indicate applications utilizing the audit logging framework.

7. The method of claim 6, further comprising receiving a new application framework table for a new application to utilize the audit logging framework.

8. The method of claim 7, wherein the new application framework comprises a plurality of parameters associated with the auditing of the new application.

9. The method of claim 8, wherein the plurality of parameters comprise one or more event types to track for the new application.

10. The method of claim 1, further comprising storing the event log.

11. The method of claim 1, further comprising providing a user interface (UI) configured to receive input for modifying the event types and to display audit logs.

12. The method of claim 1, wherein the application is an enterprise application.

13. The method of claim 1, wherein the application is a product or service.

14. The method of claim 1, further comprising registering the application with the audit logging system.

15. The method of claim 1, further comprising based on activation of a purge function, purging the audit log.

16. A machine-readable memory device having sets of instructions stored thereon for implementing event driven audit logging which, when executed by a machine, cause the machine to:
    establish an audit logging framework configured to provide application independent connectivity and further configured to provide event driven audit logging;
    receive a selection of an application to provide event driven audit logging, wherein event driven audit logging comprises logging any event that involves the application and associated applications or documents;
    plug in the application into the audit logging framework, wherein the plugging in provides integrated communication between the audit logging framework and the application; enable event driven auditing for the selected application; receive a selection of event types to enable for auditing by the audit logging framework;
    based on the selected event types, track the application actions which are only associated with the selected events;

create an event log for the application, wherein the event log only includes the tracked applications for the selected events; and provide access to the event log.

17. The machine-readable medium of claim 16, wherein the sets of instructions, when further executed by the machine, cause the machine to maintain a plurality of framework tables.

18. The machine-readable medium of claim 17, wherein the plurality of framework tables comprise entries configured to indicate applications utilizing the audit logging framework.

19. The machine-readable medium of claim 18, wherein the sets of instructions, when further executed by the machine, cause the machine to receive a new application framework table for a new application to utilize the audit logging framework.

20. The machine-readable medium of claim 19, wherein the new application framework comprises a plurality of parameters associated with the auditing of the new application.

* * * * *

UNITED STATES PATENT AND TRADEMARK OFFICE
CERTIFICATE OF CORRECTION

| | | |
|---|---|---|
| PATENT NO. | : 8,204,861 B2 | Page 1 of 1 |
| APPLICATION NO. | : 12/537877 | |
| DATED | : June 19, 2012 | |
| INVENTOR(S) | : Sondhi et al. | |

It is certified that error appears in the above-identified patent and that said Letters Patent is hereby corrected as shown below:

On sheet 4 of 8, in figure 4, Box No. 405, line 1, delete "applicaiton" and insert -- application --, therefor.

On sheet 7 of 8, in figure 7, Reference Numeral 510, line 2, delete "Systrem" and insert -- System --, therefor.

In column 1, line 31, delete "potions" and insert -- portions --, therefor.

In column 9, line 26, delete "my" and insert -- may --, therefor.

In column 9, line 43, delete "my" and insert -- may --, therefor.

Signed and Sealed this
Fourth Day of September, 2012

David J. Kappos
*Director of the United States Patent and Trademark Office*